US008977496B2

(12) United States Patent
Ulloa Paredes et al.

(10) Patent No.: US 8,977,496 B2
(45) Date of Patent: Mar. 10, 2015

(54) SYSTEM AND METHOD FOR ESTIMATING ORIGINS AND DESTINATIONS FROM IDENTIFIED END-POINT TIME-LOCATION STAMPS

(75) Inventors: Luis Rafael Ulloa Paredes, Meylan (FR); Guillaume M. Bouchard, Saint-Martin-le-Vinoux (FR)

(73) Assignee: Xerox Corporation, Norwalk, CT (US)

( * ) Notice: Subject to any disclaimer, the term of this patent is extended or adjusted under 35 U.S.C. 154(b) by 245 days.

(21) Appl. No.: 13/481,042

(22) Filed: May 25, 2012

(65) Prior Publication Data

US 2013/0317742 A1 Nov. 28, 2013

(51) Int. Cl.
*G01C 21/34* (2006.01)
*G08G 1/123* (2006.01)
*G06G 7/70* (2006.01)
*G06G 7/76* (2006.01)
*G08G 1/00* (2006.01)

(52) U.S. Cl.
USPC .......................................... 701/533; 701/117

(58) Field of Classification Search
CPC . G08G 1/0104; G08G 1/0112; G08G 1/0141; G08G 1/123; G06Q 10/06315; G06Q 10/047; G06Q 50/30; G01C 21/3617; G01C 21/343; G01C 21/3407
USPC ....................................................... 701/533
See application file for complete search history.

(56) References Cited

U.S. PATENT DOCUMENTS

| 7,529,617 | B2 * | 5/2009 | Ono et al. | 701/533 |
| 8,306,512 | B2 * | 11/2012 | Dixon et al. | 455/414.1 |
| 8,538,686 | B2 * | 9/2013 | Gruen et al. | 701/426 |
| 2010/0185486 | A1 * | 7/2010 | Barker et al. | 705/10 |

FOREIGN PATENT DOCUMENTS

| DE | 101 63 127 A1 | 7/2003 |
| DE | 10 2004 063 600 A1 | 7/2006 |
| WO | WO 2011/006142 A1 | 1/2011 |

OTHER PUBLICATIONS

European Search Report for Application No. EP 13 16 8157; Date of completion of the search: Jul. 23, 2013; Place of search: The Hague.
Bruno Agard et al., "Mining Public Transport User Behaviour from Smart Card Data," in 12th IFAC Symposium on Information Control Problems in Manufacturing, INCOM, 2006, Saint-Etienne, France, May 17-19, 2006.

(Continued)

*Primary Examiner* — Nicholas Kiswanto
(74) *Attorney, Agent, or Firm* — Fay Sharpe LLP

(57) ABSTRACT

A method and system are disclosed for estimating origin and destination locations of users of a transportation system. The origins and destinations of known users are determined during a segment of an analysis period from validation information for all users of the transportation system. The origins and destinations are then mapped to probable locations associated with the transportation network. A destination probability is then computed for each destination location of an individual origin location. A unknown users are then apportioned to each destination, which may be based on the number of unknown users on a vehicle traveling from the origin to the destination, the computed probability, and the validation information, so as to estimate the number of users traveling from an origin location to any corresponding destination location on the transportation system.

25 Claims, 10 Drawing Sheets

(56) References Cited

OTHER PUBLICATIONS

Hai Yang et al., "The Equilibrium-Based Origin-Destination Matrix Estimation Problem," Transpn. Res.-B, vol. 28B, No. 1, pp. 23-33, 1994. Printed in Great Britain.

Hai Yang et al., "Estimation of Origin-Destination Matrices from Link Traffic Counts on Congested Networks," Transpn. Res.-B, vol. 26B, No. 6, pp. 417-434, 1992. Printed in Great Britain.

M. J. Maher, "Inferences on Trip Matrices from Observations on Link Volumes: A Bayesian Statistical Approach," Transpn. Res.-B, vol. 17B, No. 6, pp. 435-447, 1983. Printed in Great Britain.

Torgil Abrahamsson, "Estimation of Origin-Destination Matrices Using Traffic Counts—A Literature Survey," International Institute for Applied Systems Analysis, Interim Report, IR-98-021/May, Austria.

C.S. Fisk, "Trip Matrix Estimation from Link Traffic Counts: The Congested Network Case," Transpn. Res.-B, vol. 23B, No. 5, pp. 331-336, 1989. Printed in Great Britain.

U.S. Appl. No. 13/351,560, filed Jan. 17, 2012, entitled, "Location-Type Tagging Using Collected Traveler Data," by Guillaume M. Bouchard et al.

U.S. Appl. No. 13/480,612, filed May 25, 2012, entitled, "System and Method for Trip Plan Crowdsourcing Using Automatic Fare Collection Data," by Boris Chidlovskii et al.

U.S. Appl. No. 13/480,802, filed May 25, 2012, entitled, "System and Method for Estimating a Dynamic Origin-Destination Matrix," by Boris Chidlovskii.

* cited by examiner ns and destinations from identified end-point time-location stamps

BACKGROUND

The following relates to the transportation arts, data processing arts, data analysis, tracking arts, and so forth.

Intelligent transportation systems generally include multiple vehicles, routes, and services that are utilized by a large number of users, which may include automatic ticketing validation systems that collect validation information for travelers. Management and planning of transportation systems entails administrators trying to identify the origins and destinations of travelers. By identifying origins and destinations, the administrators are able to build and maintain more efficient transportation systems, such as adding additional routes between frequently visited origins and destinations, increasing the number of buses or trains on a route, increasing the size of facilities (bus stops, train stations, etc.), and the like.

The identification of origins and destinations of travelers also allows for the collection of valuable information about life in the city that may be useful to city officials, urban planners, commercial interests, event planners, and the like. For example, city officials may be able to identify those origins and destinations that have large numbers of travelers and accordingly increase law enforcement levels at such locations.

Previous attempts to ascertain this information about travelers entailed the use of expensive and time-consuming procedures, such as household surveys and roadside interviews. Such surveys generally cost cities several thousand dollars every year. Additionally, they are limited in time as they are performed annually, limited to only a fraction of a transportation network, limited in the number of travelers interviewed, and limited in accuracy (a non-negligible number of travelers refuse, misrepresent, or are unavailable). Thus, even when such a survey is performed, the results are suitable for only a limited amount of time and may include substantial gaps in the collected data.

One alternative to the origin-destination survey is counting, either by sensors or manually, the boarding and alighting number of travelers from vehicles (buses, trains, trams, etc.) at strategically selected locations throughout the city. This collection may implement additional counting or tracking devices, using additional personnel on vehicles, and the like. This alternative may provide greater traveler coverage than the survey, but the underlying combinatorial problem presents an intractable number of possible solutions, where the most likely are chosen and computed. This is not a trivial problem and has been for many years the main focus of transport research. For example, selection of the locations to collect data may be made based upon past usage statistics, such that changes in the transportation system may not be adequately reflected in the data collection.

Thus, it would be advantageous to provide a method and system to obtain origin and destination estimations with a high degree of accuracy using validation data collected from in place automatic ticketing validation systems.

INCORPORATION BY REFERENCE

The following references, the disclosures of which are incorporated herein by reference, in their entirety, are mentioned.

U.S. patent application Ser. No. 13/351,560, filed Jan. 17, 2012, entitled LOCATION-TYPE TAGGING USING COLLECTED TRAVELER DATA, by Guillaume M. Bouchard, et al.

U.S. patent application Ser. No. 13/480,612, filed May 25, 2012, entitled SYSTEM AND METHOD FOR TRIP PLAN CROWDSOURCING USING AUTOMATIC FARE COLLECTION DATA, by Boris Chidlovskii and Luis Rafael Ulloa Paredes.

U.S. patent application Ser. No. 13/480,802, filed May 25, 2012, entitled SYSTEM AND METHOD FOR ESTIMATING A DYNAMIC ORIGIN-DESTINATION MATRIX, by Boris Chidlovskii.

BRIEF DESCRIPTION

In accordance with one aspect of the exemplary embodiment, a method for estimating origin and destination locations of users of a transportation system includes acquiring validation information for a set of users of the transportation system, the set of users including a set of unknown users and a set of known users. The transportation system includes a set of routes. Each route includes a set of stops which are selectable by users as origin stops and destination stops. For each of the set of known users, the method includes identifying origin stops from the validation information and predicting destination stops, based on the respective identified origin stops, during a segment of an analysis period. The method further includes mapping at least some of the origin stops and predicted destination stops to respective origin and destination locations associated with the transportation system. Based on the origin stops and respective predicted destination stops of the set of known users and the mappings, destination probabilities are computed for the destination locations from respective origin locations. Unknown users of the set of users are apportioned among the destination locations, based on the computed destination probabilities associated with each destination location and the validation information. Destinations of the unknown users traveling from an origin location to a corresponding destination location on the transportation system are estimated in accordance with the apportionment.

In another aspect, a origin and destination estimation system includes a processor and a path generator component that is configured to define a set of ordered stops from the validation information for each known user of a transportation system during a segment of an analysis period, the validation information a unique ticket identification, at least one vehicle identification, at least one stop location, and at least one timestamp. The system also includes memory in communication with the processor, which stores instructions which are executed by the processor for identifying origin stops and predicting destination stops of each known user during the analysis period segment from validation information for a plurality of users of the transportation system. The system also includes a mapping component configured for mapping each origin stop to a corresponding probable origin location associated with the transportation network with an origin assignment function and mapping each inferred destination stop to a corresponding probable destination location associated with the transportation system with a destination assignment function. The system further includes a destination probability generator configured for computing a destination probability for each destination location of an individual origin location. In addition, the memory further stores instructions which are executed by the processor for apportioning unknown users to each destination location in accordance with a number of unknown users on a vehicle associated with the vehicle identification and traveling from the origin location to the destination location, the computed destination probability associated with each destination location, and the validation information. The memory also stores instructions for estimating a destination of each unknown user traveling from an origin location to a corresponding destination location on the transportation system in accordance with the apportionment. The processor further implements at least one of the path generator, the mapping component, and the destination probability generator.

In accordance with another aspect of the exemplary embodiment, a computer-implemented method for estimating origin and destination locations of users of a transportation system includes acquiring validation information for each of a plurality of users of the transportation system for a selected analysis period, and defining, with a processor, a path for each known user of the plurality of users during a segment of the analysis period, the path including a set of ordered stops. The method further includes inferring each stop in the set of ordered stops as at least one of an origin stop or a destination stop, and mapping each inferred stop to a corresponding origin location or a destination location. In addition, the method includes computing a destination probability of known users for each of a set of destination locations associated with each origin location, and apportioning unknown users of the plurality of users to each destination location in accordance with the computed destination probability. The destination locations for each of the plurality of users during the analysis period segment are then estimated.

DETAILED DESCRIPTION

Figure 1A:
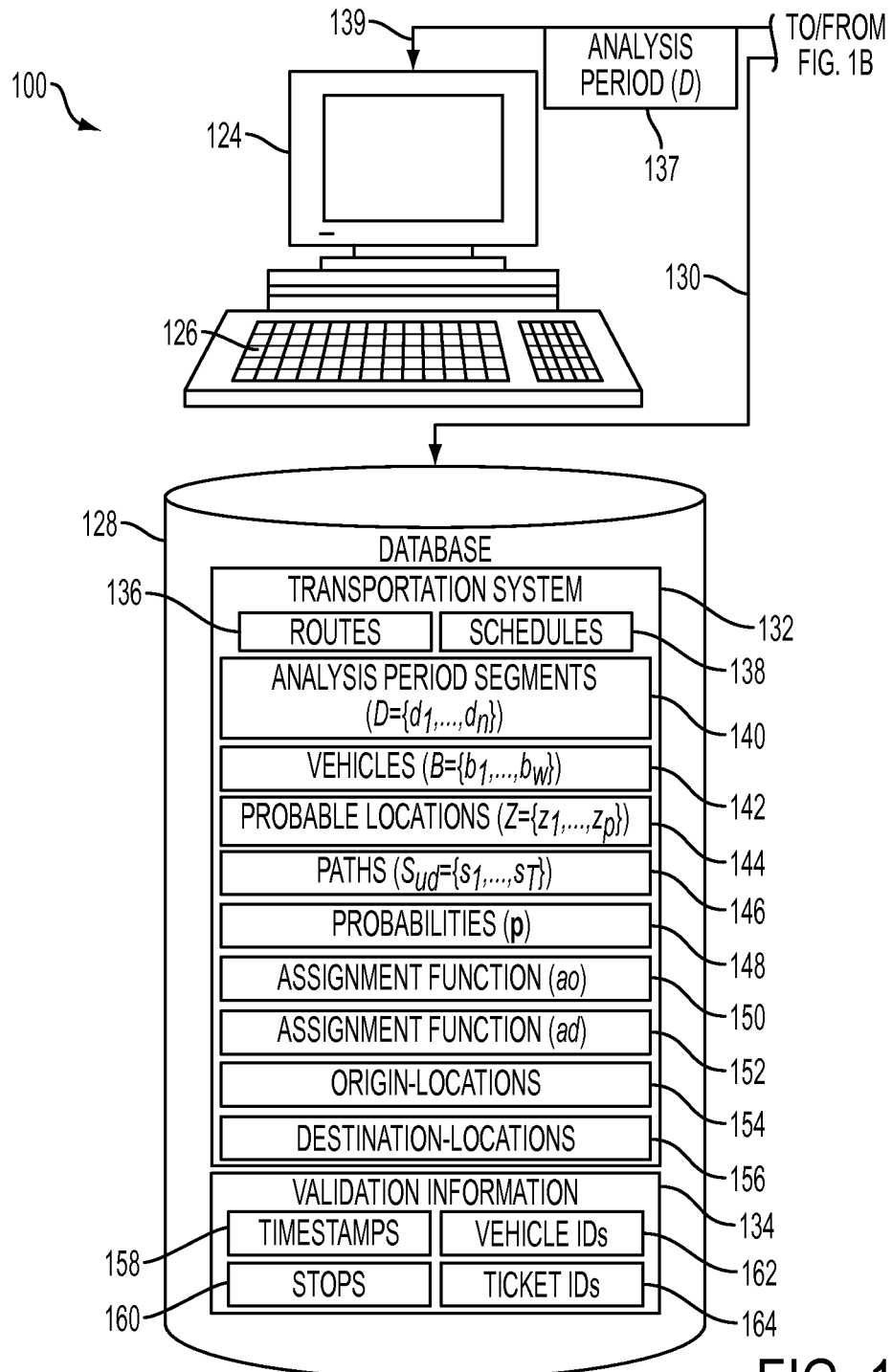
FIGS. 1A-1C is a functional block diagram of an origin and destination estimating system for users of a transportation system.

One or more implementations of the subject application will now be described with reference to the attached drawings, wherein like reference numerals are used to refer to like elements throughout.

As described herein, there is provided a method for estimating the origins and destinations of known (identified) and unknown (unidentified) users of a public transportation system using only boarding ticket validation information. Briefly, the method uses data acquired for a set of known users for which origin information is known and for which destination information can be inferred, based upon subsequent origins of the same user. The information can then be used to infer destination for the set of unknown users and the collective information to provide information about the use of the transportation system.

A transportation system includes a transportation network that includes a predefined set of routes. The routes are each traveled by one or more transportation vehicles of the transportation system, such as public transport vehicles, according to predefined schedules. The transportation vehicles may be of the same type or different types (bus, train, tram, underground transportation, or the like). In one embodiment, the transportation vehicles are buses or trams. There may be five, ten or more routes on the transportation network. Each route has a plurality of predefined stops which are spaced in their locations and in most or all cases, a route has at least two, three, four, five or more stops. A user may select a first stop on one of the predefined routes from the set of available stops on the route as his origin stop and select a second stop on the same or a different route on the network as his destination stop. A user may make connections between routes before reaching the destination stop. The user purchases or is otherwise provided with a ticket which is valid between the origin and destination stops.

The users of the transportation system, in any given time period, include a set of known users and a set of unknown users. As used herein, a known user of the transportation system is a user having a multiple destination ticket which allows a user to make two or more journeys, often at time periods spaced over the course of a day and generally over multiple days, such as a week, month, etc. The user is "known" in terms of the ID of the ticket, which allows one or more later journeys to be associated with the same ID. An unknown user is someone who purchases and/or uses a single use ticket which may allow one journey (with connections) possibly limited to a time period such as one hour. Information on the use of the transportation system by the users can be acquired in the form of validation information, when the user's ticket is read by a ticket reading device on the transportation network. Each stop at which a user may enter the transportation system is generally associated with a respective ticket reading device, either on the transportation vehicle or at a fixed location at the stop, such that a user's origin stop on the network is detected, while his destination stop is generally not known by the transportation system, although it is assumed to be limited to a set of possible stops on the route traveled by the vehicle on which his ticket is last validated (at his origin stop or at a connecting stop) or from the fixed location where it was validated.

In one embodiment, validation information, which may include one or more of a ticket identification, a boarding location, a vehicle (or route) identification, and a timestamp, is collected for every user of the transportation system, or at least a representative subset thereof. This validation information may be collected during a defined analysis period, e.g., a week, a month, three months, a year, etc. The information is used to determine a path, i.e., a sequence of stops that a user made during a segment of the analysis period, e.g., the sequence of stops the user made during one day. From the validation information collected during this segment of the analysis period, each origin (or "origin stop") of the user (i.e., each boarding) is identified, and using the vehicle identification, corresponding vehicle route and schedule, the destination (or "destination stop") for each origin may be identified or inferred. In instances where insufficient information about a user is available, i.e., users on one-hour passes, single use tickets, etc., the destination may be inferred using the information ascertained for the known users, i.e., those users with persistent ticket identifications (daily, monthly, yearly, weekly, etc.). For each origin of the known users, a set of destinations is inferred, which is used to determine a probability that a particular stop is the destination of a user from the origin. The total number of unknown users for the segment of the analysis period (based on boarding timestamps) is then determined and unknown users are apportioned to each destination in the system based upon the calculated probabilities for each corresponding. Thereafter, the identified origins and destinations may be mapped to locations in the city in which the transportation system operates, therein providing information about the number of travelers to locations in the city. In one example embodiment, actual destinations of all users are not known, since validation information is not collected when the user exits the vehicle. Thus, destinations are inferred from known users' behavior and certain reasonable assumptions. It is assumed, however, that the origin is known.

Figure 1B:
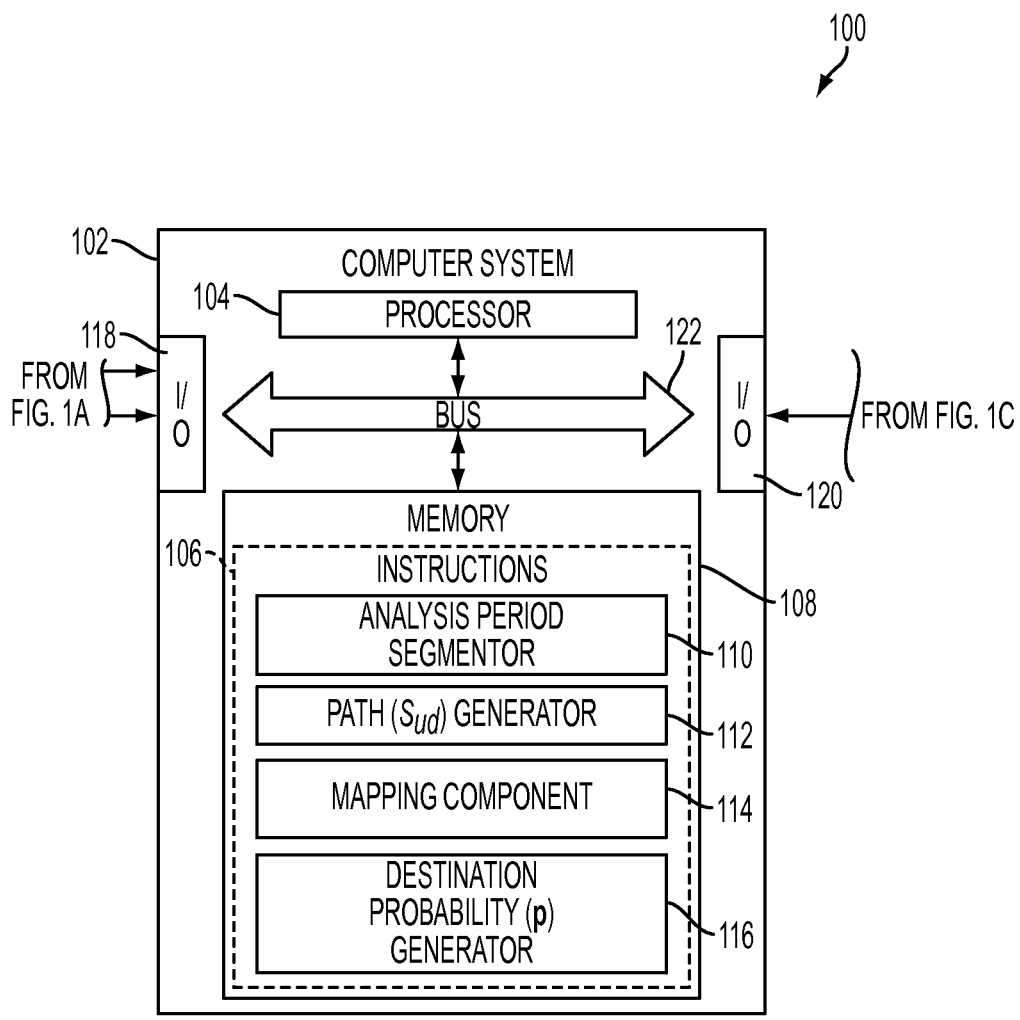
Figure 1C:
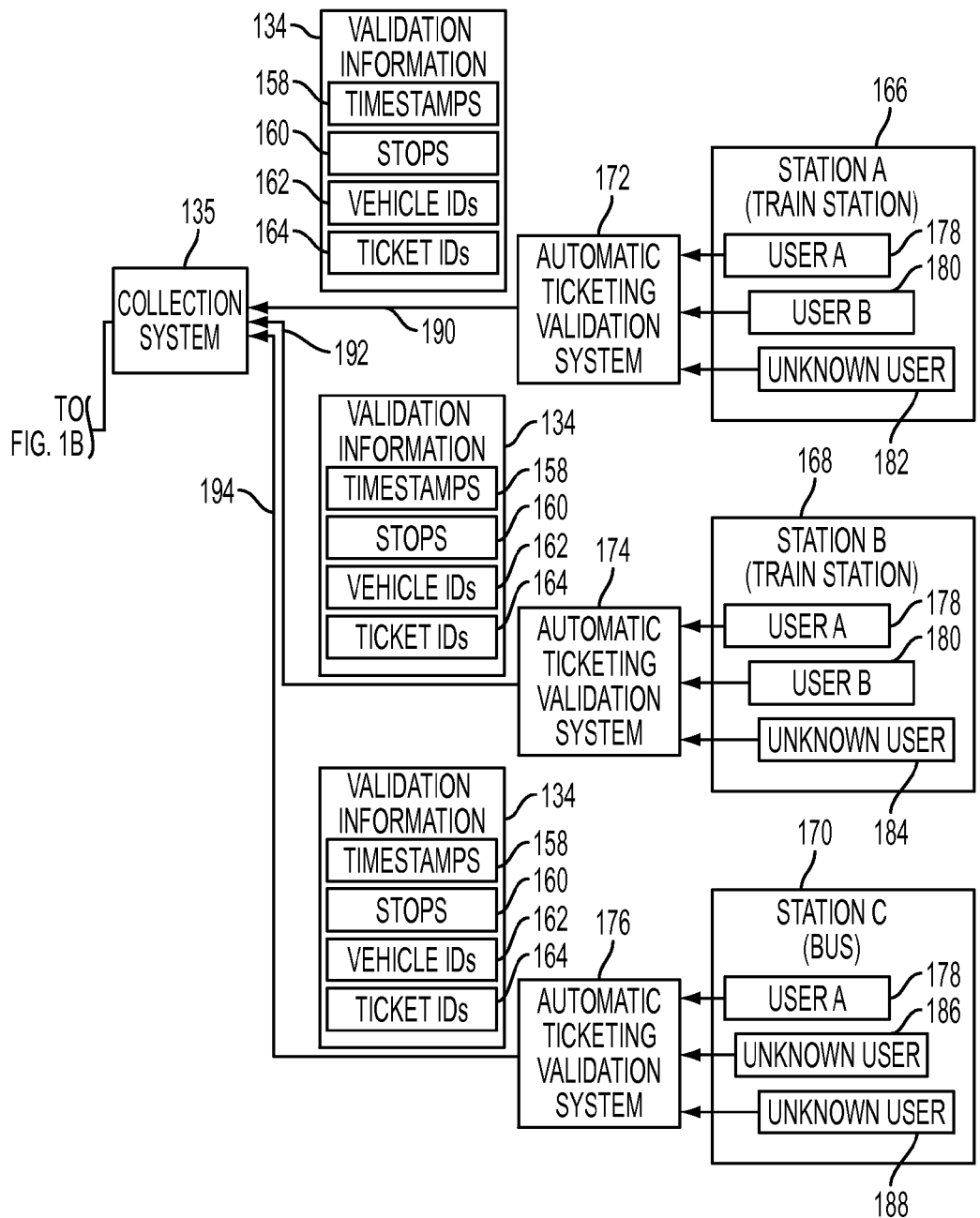

Referring now to FIGS. 1A-1C, there is shown an origin and destination estimating system 100 capable of providing a probable origin location and corresponding probable destination location for known and unknown users of a public transportation system. Such origins and destinations may correspond to stations, points of interest, schools, shopping malls, sporting arenas, government offices, or the like, of a city serviced by the transportation system. It will be appreciated that the various components depicted in FIGS. 1A-1C are for purposes of illustrating aspects of the exemplary embodiment, and that other similar components, implemented via hardware, software, or a combination thereof, are capable of being substituted therein.

As shown in FIGS. 1A-1C, the origin and destination estimating system 100 includes a computer system 102, which is capable of implementing the exemplary method described below. The exemplary computer system 102 includes a processor 104, which performs the exemplary method by execution of processing instructions 106 which are stored in memory 108 connected to the processor 104, as well as controlling the overall operation of the computer system 102.

The instructions 106 include an analysis period segmentor 110 that segments a selected analysis period (D) 137 into a predetermined number of analysis period segments ($\{d_1, \ldots, d_n\}$) 140. For example, the selected analysis period (D) 137 may be a number of days, a number of weeks, a number of months, or the like. The segmentor 110 may then segment the selected analysis period (D) 137 into, for example, a number of days or the same time period within a day over the course of a week, month, etc. It will be appreciated that the analysis period (D) 137 may be sufficiently sized to enable the capture of the set of origins-destinations for most of the users, and also small enough to ensure that most of the users have not changed their respective set of origins-destinations. Segmentation of the analysis period (D) 137 into the analysis period segments (d) 140 is explained in greater detail below with respect to FIGS. 3-6.

The instructions may also include a path generator 112 that generates a path ($S_{ud}$) 146 from validation information 134 received from automatic ticketing validation systems 160-164, as discussed below. A path ($S_{ud}$) 146 may correspond to a set of ordered stops taken by a specific user during a specific day, as illustrated more fully below with respect to FIG. 2). Additional description of the paths ($S_{ud}$) 146 defined by the path generator 112 in accordance with the validation information 134 is set forth below.

The instructions 106 may also include a mapping component 114 that generates origin locations 154 and destination locations 156 respectively based upon an origin assignment function (ao) 150 and a destination assignment function (ad) 152. The mapping component 114 may facilitate the association of origin stops and destination stops 160 to corresponding probable locations (Z) 144 of the transportation system 132. The probable locations (Z) 144 may include a plurality of partitions or zones (P) into which a city serviced by the transportation system 132 is divided. Probable locations (Z) 144 may include, for example and without limitation, sporting venues, government offices, train stations, shopping malls/districts, schools, industrial centers, residential locations, and the like. It will be appreciated that the probable locations (Z) 144 may correspond to one or more stops (s) 160 of the transportation system 132. Additionally, the mapping component 114 may use routes 136, schedules 138, city maps, and the like, to determine the probable location (Z) 144 in the city to which origin and destination stops correspond. Additional operations of the mapping component 114 will be better understood in conjunction with FIGS. 3-6, discussed below.

The instructions may further include a destination probability generator 116 that generates a probability (p) 148 that a destination location is the actual destination of a user from a particular origin location. As discussed in greater detail below, the destination probability generator 116 may facilitate the determination of the probability (p) 148 that a destination location from a set of destination locations associated with a single origin location is the most likely destination location to which the corresponding user has traveled. FIGS. 3-6, as set forth below, provide additional explanation as to the usage of the generated destination probability (p) 148 in determining a number of unknown users (L) that may be attributed to any given destination location 156.

The various components of the computer system 102 may all be connected by a data/control bus 122. The processor 104 of the computer system 102 is in communication with an associated database 128 via a link 130. A suitable communications link 130 may include, for example, the public switched telephone network, a proprietary communications network, infrared, optical, or other suitable wired or wireless data transmission communications. The database 128 is capable of implementation on components of the computer system 102, e.g., stored in local memory 108, i.e., on hard drives, virtual drives, or the like, or on remote memory accessible to the computer system 102.

The associated database 128 corresponds to any organized collections of data (e.g., validation information, probable locations, destination probabilities, vehicles, assignment functions, analysis period segments, routes, schedules, stop locations) used for one or more purposes. Implementation of the associated database 128 is capable of occurring on any mass storage device(s), for example, magnetic storage drives, a hard disk drive, optical storage devices, flash memory devices, or a suitable combination thereof. The associated database 128 may be implemented as a component of the computer system 102, e.g., resident in memory 108, or the like.

Figure 2:
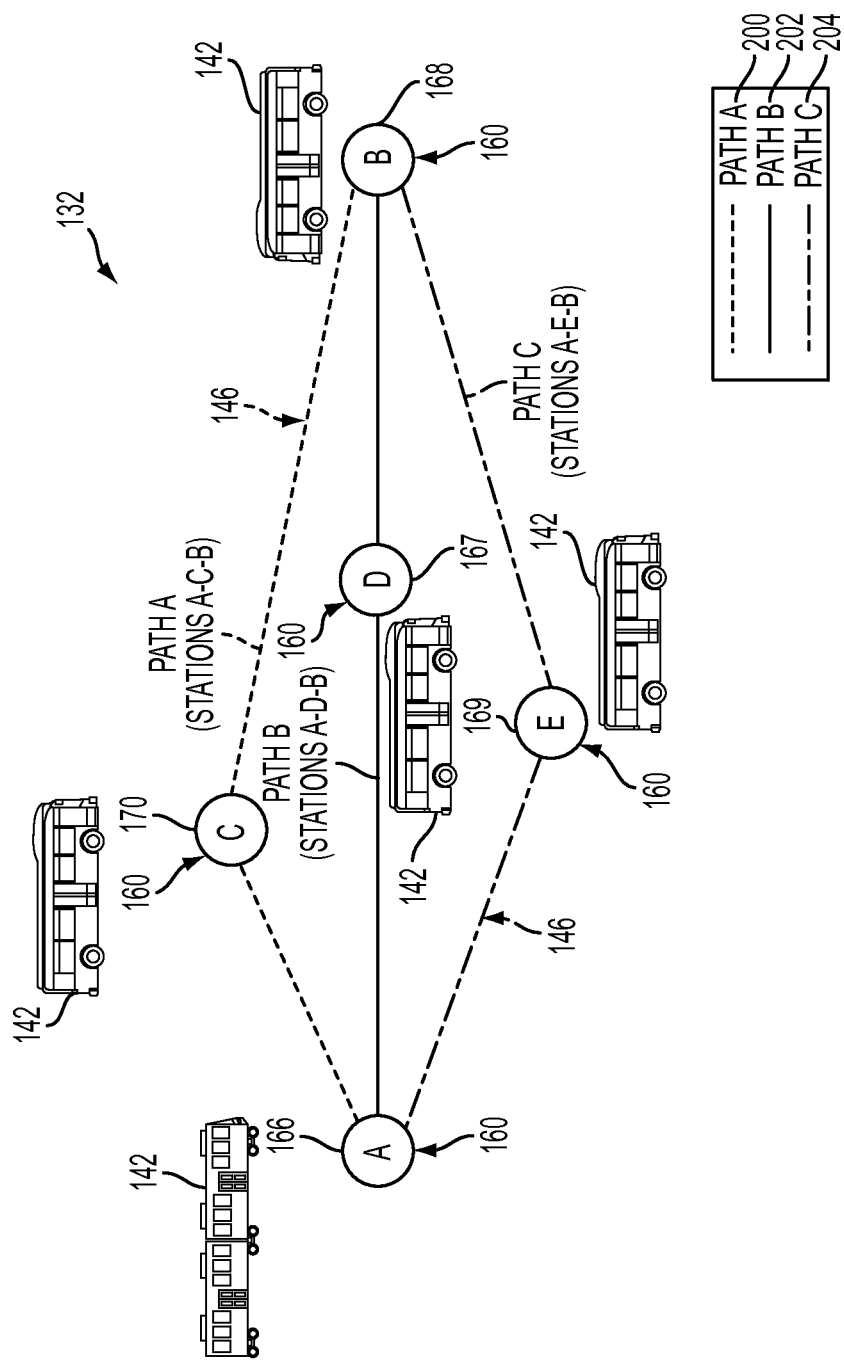
FIG. 2 is a functional diagram of an example transportation system for use in the origin and destination estimating system for users of a transportation system.

In one embodiment, the associated database 128 may include data corresponding to an associated transportation system 132, a collection of routes 136 (a sequence of stops by an individual vehicle along of a course of travel available on the transportation system 132), schedules 138 that pertain to the arrival/departure times of buses, trams, subways or other vehicles 142, etc., of the transportation system 132, segments 140 (($D=\{d_1, \ldots, d_n\}$ for (n) selected segments) generated by the analysis period segmentor 110 from the selected analysis period (D) 137, vehicles 142 (($B=\{b_1, \ldots, b_W\}$ for (W) vehicles) associated with the transportation system 132, probable locations 144 (($Z=\{z_1, \ldots, z_P\}$) for (P) partitions or zones of the city e.g., a set of geographical areas of the city associated with the transportation system 132.), paths 146 (($S_{ud}=\{s_1,\ldots,s_T\}$) for (T) stops (s) 160 (i.e., a set of ordered stops (s) 160 taken by a specific user (u) during a specific analysis period segment (d) 140, as illustrated more fully below with respect to FIG. 2), probabilities 148

$$\left(p\left(z_i \xrightarrow{b_v} z_j \mid K\right)\right)$$

where ($K=\{k_1,\ldots,k_Q\}$ for (Q) known users), origin-assignment function (ao) 150, destination-assignment function (ad) 152, origin locations ($z_1$) 154, destination locations ($z_j$) 156, and validation information 134. The validation information 134 may correspond to ticket validations collected by a collection system 135 from various collection components (e.g., the automatic ticketing validation systems 172, 174, and 176 respectively located at stop A (train station) 166, stop B 168, stop C 170, and the like), and comprise, for example, boarding timestamps 158, stops 160 representative of bus stops, stations, or the like, at which a user boarded a vehicle (b) 142, vehicle identifications 162 corresponding to the bus, train, or other type of transportation vehicle (b) 142 on which the user associated with the validation information validated a ticket, and ticket identifications 164 corresponding to each ticket validated on the transportation system 132.

The validation information 134 collected by the data collection system 135 may correspond to users of the transportation system 132, such as each ticket's unique identification 164 (e.g., the ticket identification 164 may be derived from a smart card, a transit card, transit ticket, or the like, that cannot be rewritten or otherwise altered by the user (anti-counterfeiting properties)), stops (s) 160 (boarding stops at which the ticket was used, i.e., validated), vehicle identifications 162 (a vehicle identification associated with the vehicle (b) 142 boarded by the user on which or at which the ticket was validated), and timestamps 158 associated with the actual times each ticket identification 164 was used. That is, each set of validation information 134 may include the time of entry of the user on the public transportation along with the corresponding stop (s) 160 or route 136 (i.e., vehicle identification 162 which may be cross referenced with the schedule 138 to ascertain the station/stop (s) 160 on the route 136) at which the user boarded, and the like. While each user on a public transportation system 132 is generally a person, users of other networked transportation systems may include goods or other inanimate objects.

Each stop (s) 160 of the validation information 134 may include one or more of a route identifier e.g., a route number, a stop identifier, e.g., a stop number, an address, GPS coordinates, or other geographical identification information associated with the location. The time component of the stamp 158 may include one or more of a time of day, a day, a date, or other temporal information corresponding to the stamp 158. The collected validation information 134 used in the method may thus be ticketing data, collected via usage of prepaid cards, single use transit tickets, reloadable transit cards, or other ticketing devices, e.g., biometric identification (finger prints, retina scans, etc.), mobile devices (i.e., near field communications)), and the like. The vehicle identifications 162 may reflect a bus number, train number, car number, or other identifier associated with each vehicle (b) 142 on the transportation system 132.

The validation information 134 may be collected from a plurality of locations, illustrated in FIGS. 1A-1C as stop A 166, stop B 168, and stop C 170. Each of these locations 166-170 may correspond to a respective one of a finite set of stops (s) 160 (e.g., train stations or vehicles (b) 142) connected in the transportation system 132. As shown in FIGS. 1A-1C, stations A and B 166-168 are representative train stations on the transportation network 132, whereas stop C 170 is representative of a bus operating on the transportation network 132. It will be appreciated that the collection of such information 134 may be performed by ticket validation machines for fare collection, i.e., automatic ticket validation systems 172, 174, and 176 at each respective station 166, 168, and 170, such as smart card readers, magnetic card readers, input terminals, ticket dispensers, ticket readers, and the like, and may include boarding (origin) information only, i.e., no destination information is collected other than it can be assumed that the user exited at one of the predetermined stops. It will be appreciated that such automatic ticket validation systems 172, 174, and 176 may be implemented at stations 166, 168, and, on vehicles (e.g., bus 142) shown in FIGS. 1A-1C as 170, etc., and may represent automatic fare collection subsystems.

Exemplary known users 178 and 180 on the transportation system 132 use persistent transportation cards/tickets, e.g., tickets having multiple day usage, i.e., 1 day, 10 day, 30 day, monthly, bi-monthly, semi-annually, etc., and exemplary unknown users 182, 184, 186, and 188 use non-persistent cards/tickets, e.g., tickets having limited usage, i.e., single hour usage, single trip, etc. The users 178-188 may use respective tickets to pay for or otherwise enable travel on the transportation system 132, which may be scanned, read, inserted in, or otherwise detected by the automatic ticket validation systems 172, 174, and 176 as the travelers 178-188 travel on the transportation system 132. Such transportation cards may include smart card-like capabilities, e.g., microchip transmissions, magnetically stored data, and the like. In such embodiments, the automatic ticket validation systems 172-176 communicate validation sequence information 134 to the computer system 102 via respective links 192, 194, and 196. Suitable communications links 192, 194, and 196 may include, for example, the public switched telephone network, a proprietary communications network, infrared, optical, or any other suitable wired or wireless data transmission communications.

Additional information may be collected by the automatic ticket validation systems 172-176 corresponding to ticketing operations including transportation usage data, ticketing receipt data, congestion data, and the like. According to one embodiment, electronic validation records pertaining to the entry of users 178-188 onto a vehicle 142 of the transportation system 132 may be collected as the validation information 134. It will be appreciated that the destinations of users 178-188 in an entry-only system are not generally known or readily apparent from the automatic ticketing validation data, i.e., the validation information 134 collected by the automatic ticket validation systems 172-176. The destinations may be discerned through inferences based upon non-validation data, including information collected for the known users, and certain user assumptions, as set forth in greater detail below with respect to FIGS. 3-6.

The systems and methods described herein may use one-trip tickets, e.g., the unknown users 182-188, as well as prepaid cards, e.g., the known users 178-180, which are reflected in the ticket identifications 164 included in the collected validation information 134. It will be appreciated that a one trip ticket may have a fixed validation time, i.e., a period of time during which the ticket remains valid for use by a traveler. For example, the time during which the ticket is valid may be limited to 1 hour from the time of issuance/purchase, during which time travelers 182-188 may change vehicles 142 within the transportation network 132 without incurring an additional charge. The first validation of such a ticket may be identified by a sequence tag indicating 'First', whereas the second and subsequent validations during this validation time may be identified by a sequence tag indicating 'Correspondence'. The correspondence tag can be used to infer that the corresponding stop is not the user's final trip destination except, for example, when the user retraces his route in the opposite direction with a one hour time period based on the assumption that the system 100 tagged the stop as a correspondence when the user was returning from his destination. The automatic ticketing validation systems 172-176 may allow for the use of multiple entry cards, which may provide for multiple entries by a user 178-180 and long-term permanent cards to requesting users. It will be appreciated that the use of single and multiple entry cards may permit tracking traveling data of each card holding user 178-188, as well as allowing for time-based analysis of such users 178-188.

The automatic ticketing validation systems 172-176 may allow for location identification, corresponding to the entry of a user 178-188. For example, the automatic ticketing validation systems 172-176 may enable each validation of a ticket to include a ticket identification 164 (a unique identification which may be considered a user ID), vehicle identification 162, stop (s) 160, and timestamp 158. Additionally, the automatic ticketing validation systems 172-176 can use automatic vehicle location subsystems to associate a ticket validation with the public transportation route 136, stop (s) 160 (e.g., vehicle (b) 142, stations 166-168, etc.) and direction. Other methods for collecting validation information 134 may alternatively or additionally be used, including, mobile communication events, e.g., time-stamped antenna authentication sequences or other observations of the intersecting of scheduled activities and traveler schedules. It will further be appreciated that the ticket validations, i.e., the validation information 134 collected in the automatic ticketing validation systems 172-176 may provide information for understanding the traveler flows in the transportation network 132. Information in a typical installation can be analyzed in order to provide valuable insights for the transit and public transportation agencies and assist in decision making processes.

The validation information 134 associated with the implementation of FIGS. 1A-1C are for example purposes only. Other applications outside of the public transportation example are also contemplated. For example, toll-road monitoring and management systems may also take advantage of the subject systems and methods, whereby validation information 134 is collected at toll-booths, upon entry a vehicle with respect to the associated toll road. Other embodiments, e.g., hospital monitoring of patient/employee entries and exits, secure facility monitoring, and the like, are also contemplated.

In one embodiment, when estimating the links between origins and destinations of users 178-188 of the transportation system 132, an administrator or transit manager may initiate operations by selecting an analysis period (D) 137 via the user input device 126 to the computer system 102, or this may be selected automatically by the system. The analysis period (D) 137 may be submitted via the link 139 or directly input to system 102. The analysis period (D) 137 serves to designate the number of days, weeks, months, or years to be analyzed in accordance with the method described in FIGS. 3-6, which may be segmented by the segmentor 110 into individual days (d) or other time periods.

The computer system 102 also includes one or more input/output (I/O) interface devices 118 and 120 for communicating with external devices. The I/O interface 118 may communicate with one or more of a display device 124, for displaying information, such estimated destinations, and a user input device 126, such as a keyboard or touch or writable screen, for inputting text, and/or a cursor control device, such as mouse, trackball, or the like, for communicating user input information and command selections to the processor 104. The user input device 126 may be configured to input an analysis period (D) 137, corresponding to a set period of time during which an estimation of the origins and destinations of users of the transportation system 132, as will be understood with respect to FIGS. 3-6.

It will be appreciated that the origin and destination estimating system 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1A-1C as a networked set of components, the system and method are capable of implementation on a stand-alone device adapted to perform the methods described herein.

The computer system 102 may include a computer server, workstation, personal computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 120, 122 allow the computer to communicate with other devices via a computer network, and may comprise a modulator/demodulator (MODEM). Memory 108 may store data processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIGS. 3-6.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 provides an example of paths 146 in a transportation system 132 between an origin stop (s) 160 (depicted as stop A 166) and a destination stop (s) 160 (depicted as stop B 168). The origin stop is the first stop on the transportation system of the user's path, which proceeds from an origin stop to a destination stop which may pass through one or more transfer stops along the path. The transportation system 132 of FIG. 2 provides three paths 146 (depicted as path A 200, path B 202, and path C 204) between the origin stop (s) 160 at stop A 166 and the destination stop (s) 160 at stop B 168. Path A 200 depicts travel between stations A and B 166, 168 with a transfer at another stop (s) 160, depicted as correspondence stop C 170, e.g., a user 178-188 boards a vehicle 142, e.g., a train, at stop A 166, boards another vehicle 142 (e.g., a bus) at another stop (s) 160, shown as stop C 170, and completes the journey to the destination stop (s) 160 at stop B 168. It will be appreciated that the alighting at the stop (s) 160 of stop C 170 and the stop (s) 160 at stop B 168 are not recorded. However, the boarding of another vehicle at stop C 170 is captured in the validation information 136 for the corresponding user 178-188. Similarly, the alighting of the user 178-188 at stop B 168 is not recorded, however, the inferring of stop B 170 as a destination stop (s) 160 is performed in accordance with the methodology of FIGS. 3-6, set forth in greater detail below.

Similarly, path B 202 depicts a sequence of stops (e.g., $\{s_1, \ldots, s_T\}$) 160 of a user 178-188, shown as travel between stations A and B 166, 166 with a transfer at another stop 160, depicted in FIG. 2 as station D 167. That is, a user 178-188 boards a vehicle (b) 142 (e.g., a train) at an origin stop 160 (stop A 166), boards another vehicle (b) 142 (e.g., a bus) at stop D 167, and completes the journey to stop B 168. As briefly addressed above, the determination of stops 160 at station D 167 and stop B 168 are made based upon boarding of vehicles (b) 142 at each stop (s) 160, as set forth in FIGS. 3-6. FIG. 2 also illustrates a third path, path C 200, which depicts travel between stations A and B 166, 168 with a transfer at another stop (s) 160, depicted as station E 169. Thus, a user 178-188 may board a vehicle (b) 142 (e.g., a train) at the stop (s) 160 associated with stop A 166. The validation information 134 may then indicate a boarding of another vehicle (b) 142 (e.g., a bus) at station E 169, which may be indicative of an alighting at the stop 160 associated with station E 169, following which the user 178-188 completes the journey to stop B 168, as indicated in the validation information 134 by a boarding at the stop 160 associated with stop B 168.

Figure 3:
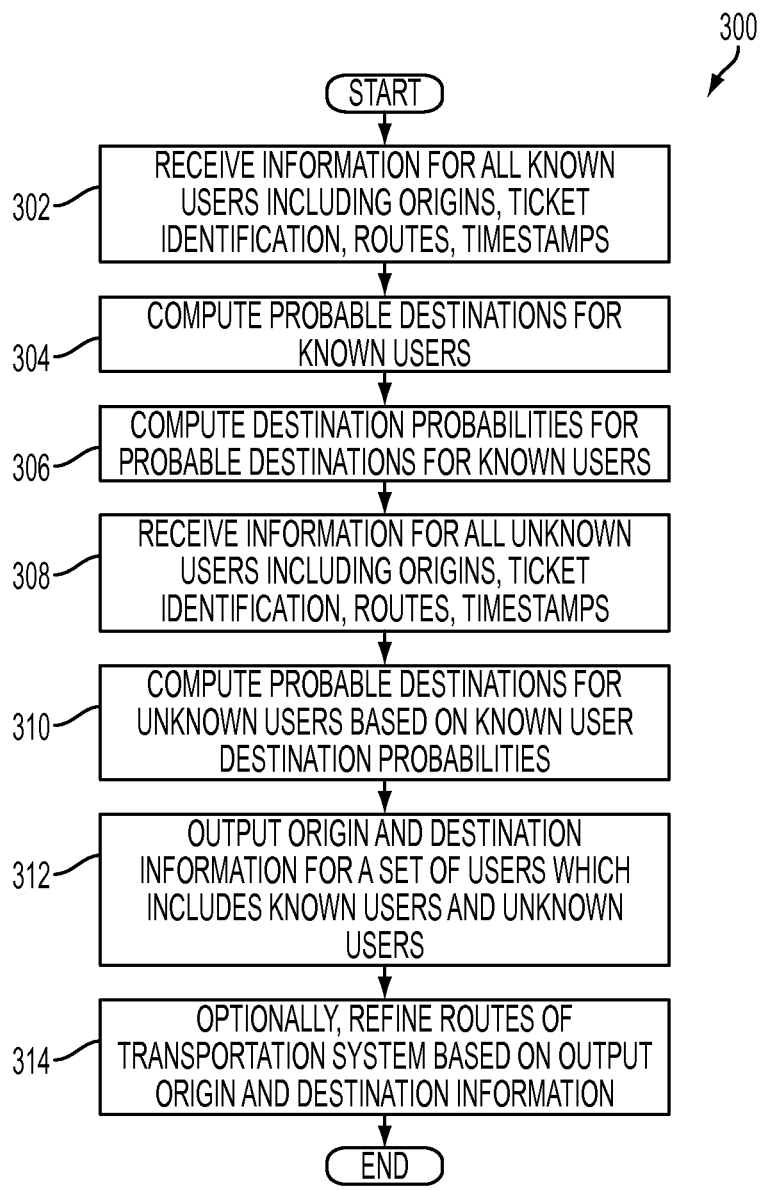
FIG. 3 is a flowchart which illustrates a method for estimating origins and destinations of users of a transportation network.

Turning now to FIG. 3, there is shown an overview of the exemplary method 300 set forth in FIGS. 4A-6 for estimating origins and destinations of users of the transportation system 132. At 302, information is received for all (or at least a set of) known users 178-180 of the transportation system 132. This information may include, for example, origin stops, ticket identification, routes, timestamps, and the like. At 304, probable destination stops for the known users 178-180 are computed, based on the information received at 302, as set forth in greater detail below in FIGS. 4A-4B.

Figure 5:
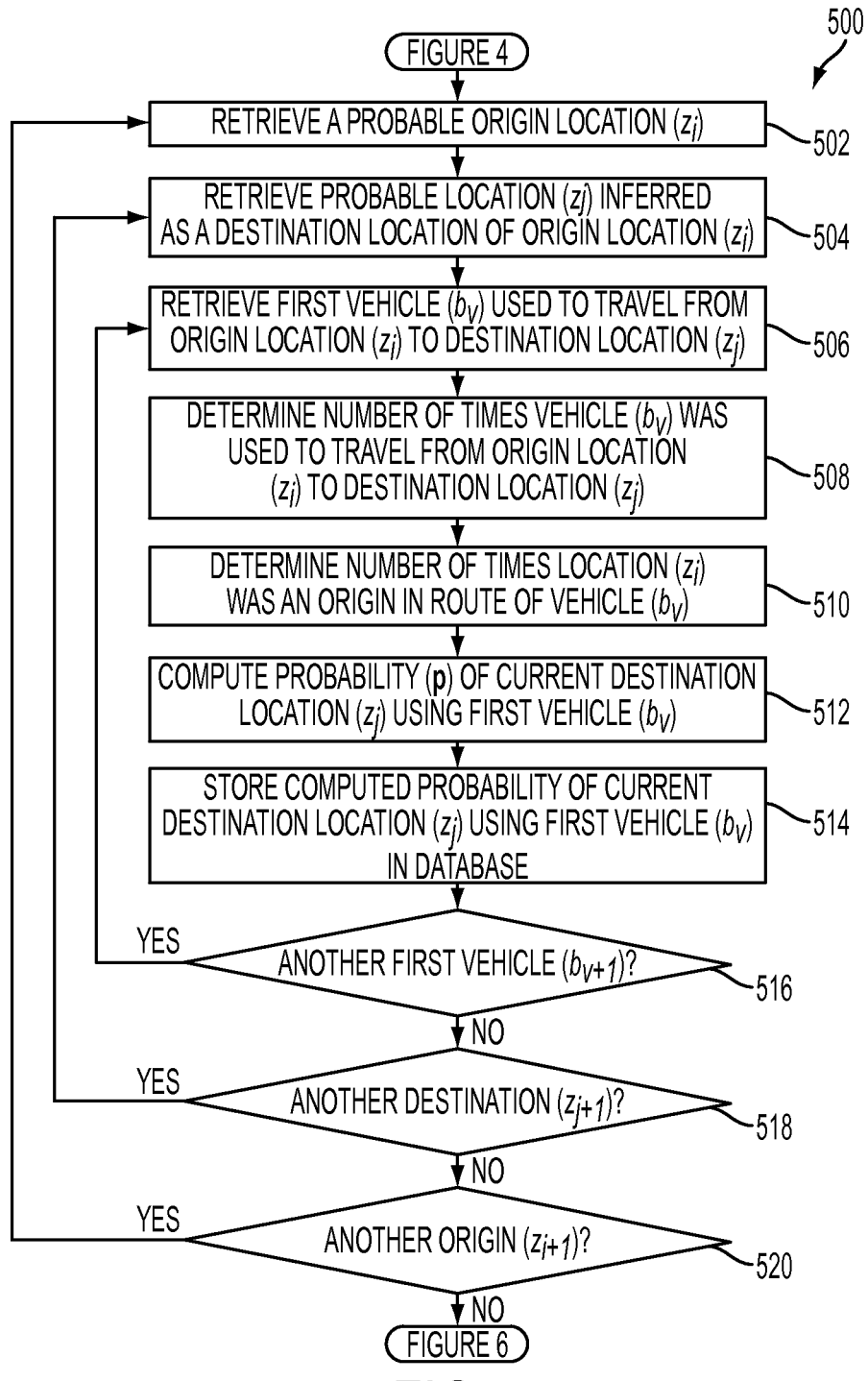
FIG. 5 is a flowchart which illustrates part of the method for estimating origins and destinations for users of a transportation network.

At 306, destination stop probabilities are then computed for the known users 178-180 for each probable destination stop in accordance with the routes, origin stops, and probable (inferred) destination stops, as illustrated more fully in FIG. 5.

Information is received for a set of unknown users 182-188 at 308, including respective origin stops, routes, timestamps, and the like. This may occur contemporaneously with 302. The probable destinations of the unknown users 182-188 are then computed at 310, based upon the known user destination probabilities, as illustrated more fully in FIG. 6.

Origin and destination information is then output at 312 for a set of users which includes known users 178-180 and unknown users 182-188. This may include probable locations to which the users went to from each origin stop on the network, the number of travelers who did so in a given time period, and so forth. Optionally, at 314, the routes 136 of the transportation system 132 are refined based on the output origin and destination information.

Figure 4A:
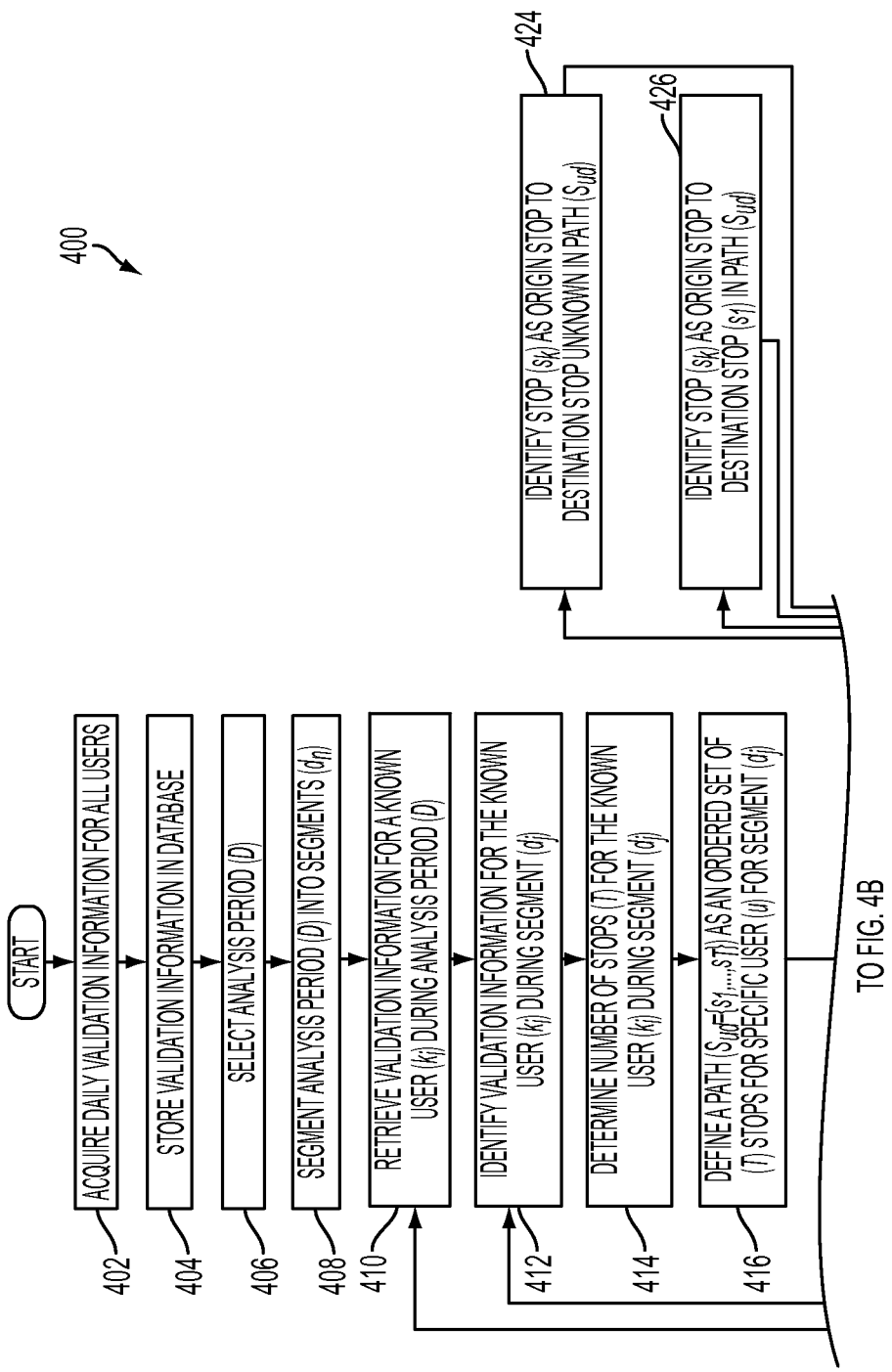
FIGS. 4A-4B is flowchart which illustrates part of a method for estimating origins and destinations of users of a transportation network.
Figure 4B:
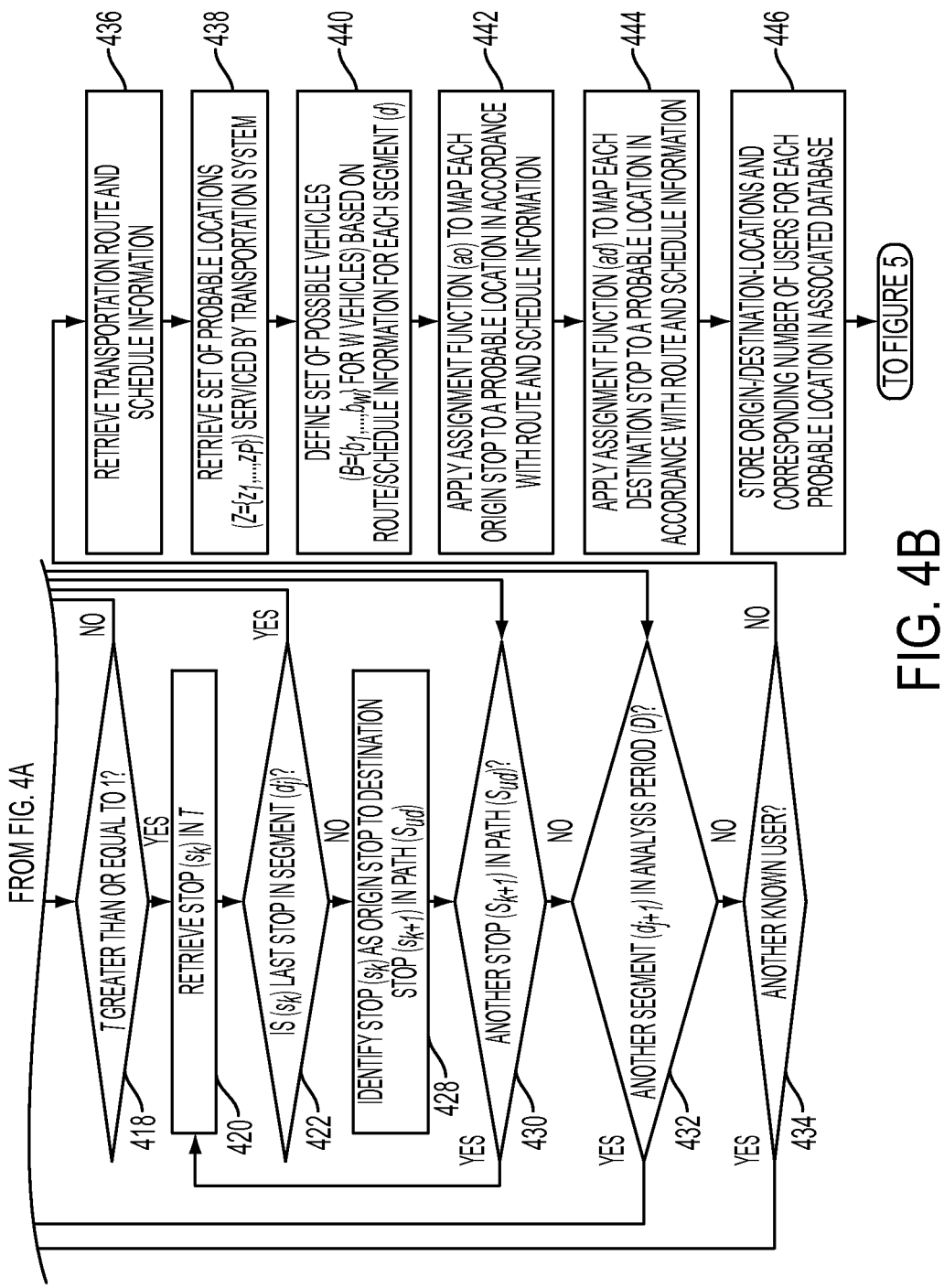

Referring now to FIGS. 4A-4B and ALGORITHM 1, there is provided a flowchart 400 illustrating part of the method for estimating origins and destinations of users. Operations of FIGS. 4A-4B (and FIG. 5 as discussed below) may be better understood in conjunction with ALGORITHM 1, which illustrates the destination inferences for known users (K) 178-180 and the mapping of inferred destinations to probable locations (Z) 144:

---
ALGORITHM 1
---

For each known user $k_i$ in K:
    For each selected day $d_j$ in D:
        If user has strictly more than 1 stop:
            For each ordered stop $s_k$ in T:
                If $s_k$ is not the last stop of the day:
                      Add to the user path the trip with stops: from $s_k$ to $s_{k+1}$
                Else:
                      Add to the user path the trip with stops: from $s_k$ to $s_1$
        If user has 1 stop:
            Add to the user path the trip with stops: from $s_k$ to stop labelled unknown
For every stop-origin use an assignment function ao to map to most probable possible location
For every stop-destination use an assignment function ad to map to most probable possible location

---

Operations begin at 402, whereupon validation information 134 from the automatic ticketing validation systems 172-176 is received, which validation information 134 corresponds to the boardings of each known user 178-180 and unknown user 182-188. In the example implementation of FIGS. 4A-4B, validation information 136 is received for a set of users, which may be defined as K={$k_1, \ldots, k_Q$} for (Q) known users, and a set of unknown users (L), which may be defined as L={$l_1, \ldots, l_H$} for (H) unknown users. As set forth above, a known user (K) 178-180 may have a persistent ticket identification 164, such as a monthly or yearly pass. In contrast, the unknown users (L) 182-188 generally use single use or hourly passes, such that the same user 182-188 may have different ticket identifications during the selected analysis period (D) 137. FIGS. 4A-4B therefore provides a suitable illustration of estimating the origin locations ($z_i$) 154 and destination locations ($z_j$) 156 of known users (K) 178-180, and FIGS. 5-6 address the estimation for unknown users (L) 182-188 using the estimations made in FIGS. 4A-4B.

Reference may be made hereinafter to the validation information 136 as including boarding information (stops (s) 160, vehicle identifications 162, etc.) with the corresponding timestamps 158, for every user 178-188 (e.g., ticket identifications 164). According to one embodiment, the automatic ticketing validation systems 172-176 may be located on a vehicle 142, such that the stops (s) 160 may be identified using the vehicle identification 162 in view of the routes 136 and schedules 138 of the transportation system 132. For example, the vehicle identification 162 may be used to determine the stop (s) location 160 based on the timestamp 156, i.e., the vehicle (b) 142 should have been at stop (r) (route 136) at time (y) (schedule 138) based on the time (q) (timestamp 156) at which the user 178-188 boarded the vehicle (b) 142, or based on GPS information.

At 404, the validation information 134 is stored by the computer system 102 in the database 128. An analysis period (D) 137 is then selected at 406, (e.g., by an administrator or transportation system personnel, or automatically) corresponding to a period of time for which estimations of origins 154 and destinations 156 of users 178-188 are desired. The selected analysis period (D) 137 may correspond to a period of a week, a month, several months, a year, or the like. At 408, the analysis period segmentor 110 segments the selected analysis period (D) 137 into predetermined segments 140, e.g., days. For example purposes, the segmentation of the analysis period (D) 137 in FIGS. 3-6 may be defined such that D={$d_1, \ldots, d_n$} for (n) selected segments, wherein each segment may correspond to a single day (24-hour period), or a shorter segment.

Validation information 134 is then retrieved for a known user ($k_i$) 178 or 180 of the set of known users (K) from the associated database 128 during the selected analysis period (D) 137 at 410. At 412, the validation information 134 corresponding to the known user ($k_i$) 178 or 180 during a segment ($d_j$) 140 of the analysis period (D) 137 is identified. That is, the validation information 134 for the particular known user ($k_i$) 178 or 180 for one particular day of the analysis period (D) 137 is identified. The number of stops in the set of (T) stops for the known user ($k_i$) 178 or 180 during that particular segment (d) 140 is then determined at 414 (which generally excludes correspondence stops). Since only origin stops are identified in the exemplary embodiment, the set of (T) stops includes only origin stops.

A path ($S_{ud}$) 146 is then defined as the ordered set of stops ({$s_1, \ldots, s_T$}) 160 for a specific user (u) (i.e., the known user ($k_i$) 178 or 180) for the segment ($d_j$) 140 at 416 by the path generator 112. That is, the path generator 112 defines the path 146 for the known user ($k_i$) 178 or 180 as ($S_{ud}$={$s_1, \ldots, s_T$}) for (T) number of stops during the analysis period segment ($d_j$) 140. A determination is then made at 418 whether the number of stops (T) associated with the path ($S_{ud}$) 146 is greater than 1. That is, a determination is made whether the known user ($k_i$) 178 or 180 had more than one stop (s) 160 during the time segment ($d_j$) 140.

If the known user ($k_1$) 178 or 180 made only a single stop during the time segment ($d_j$) 140, operations proceed to 424, whereupon the single stop 160 (i.e., stop ($s_k$) of the set {$s_1, \ldots, s_T$}) is identified as an origin stop with an unknown destination stop for the path ($S_{ud}$) 146. A determination is then made at step 432 whether another analysis period segment ($d_{j+1}$) remains in the analysis period (D) 137 for the known user ($k_i$) 178 or 180. A positive determination at 432 returns operations to 412, whereupon the validation information 134 for the known user ($k_i$) 178 or 180 during the new analysis period segment ($d_{j+1}$) 140 is identified. Upon a negative determination at 432, operations proceed to 434, as discussed more fully below.

Returning to 418, upon a determination that the number of stops (T) during the analysis period segment ($d_j$) 140 is greater than 1, operations proceed to 420, whereupon a stop ($s_k$) 160 is retrieved from the set of (T) stops (i.e., {$s_1, \ldots, s_T$}), where k=1:T. A determination is then made at 422 whether the retrieved stop ($s_k$) 160 is the last stop ($s_T$) 160 in the analysis period segment ($d_j$) 140. When it is determined at 422 that the retrieved stop ($s_k$) 160 is not the last stop of the analysis period segment ($d_j$), the retrieved stop ($s_k$) 160 is identified as an origin stop with an inferred destination stop of ($s_{k+1}$) in the path ($S_{ud}$) 146 at 428. That is, the retrieved stop ($s_k$) 160 is identified in the path ($S_{ud}$) 146 as an origin stop, and the next stop ($s_{k+1}$) 160 in the path ($S_{ud}$) 146 after the retrieved stop ($s_k$) 160 is inferred to be its corresponding destination stop. A determination is then made at 430 whether another stop 160, e.g., stop ($s_{k+1}$) 160, remains in the path ($S_{ud}$) 146 unidentified as an origin stop. Upon a positive determination at 430, operations return to 420, whereupon this additional stop ($s_{k+1}$) 160 is retrieved from the defined path ($S_{ud}$) 146 and operations continue to 422, as set forth above.

Upon a determination at 422 that the retrieved stop ($s_k$) 160 is the last stop ($s_T$) 160 in the analysis period segment ($d_j$) 140, operations proceed to 424. At 424, the retrieved stop ($s_k$) 160 is identified as being an origin stop having a corresponding destination stop ($s_1$) 160. That is, when the retrieved stop ($s_k$) 160 is identified as the last stop ($s_T$) 160 of the day (i.e., segment ($d_j$) 140), the stop ($s_k$) 160 is inferred to have, as its corresponding destination, the first stop ($s_1$) 160 of the day. Such an identification may be made in accordance with an inference that a user 178-188 is likely to return to his or her starting stop ($s_1$) 160 at the end of the day, and thus the boarding at the final stop ($s_T$) 160 of the day designates the first stop ($s_1$) as the likely destination. Similarly, by ascertaining the last stop ($s_T$) 160 of the day, an inference may be made that the last stop ($s_T$) of the day is also a possible destination of the first stop ($s_1$) 160. After identifying the retrieved stop ($s_k$) 160 as an origin stop with an inferred destination at stop ($s_1$) 160, operations proceed to 432, whereupon a determination is made whether another analysis period segment ($d_{j+1}$) 140 in the analysis period (D) 137 remains for analysis. A positive determination at 432 prompts a return to 412, whereupon the validation information 134 for the analysis period segment ($d_{j+1}$) 140 is identified, and operations proceed to step 414, as set forth above.

Upon a determination at 432 that no additional analysis period segments ($d_j$) 140 remain in the analysis period (D) 137, operations proceed to 434. At 434, a determination is made whether another known user ($k_{i+1}$) 178 or 180 remains in the set of known users ({$k_1, \ldots, k_Q$}) associated with the analysis period (D) 137. Upon a positive determination at 434, operations return to 410, whereupon the validation information 134 for the additional known user ($k_{i+1}$) 178 or 180 during the analysis period (D) 137 is retrieved from the associated database 128. The validation information 134 for the known user ($k_{i+1}$) during the analysis period segment ($d_j$) 140 is then identified and the corresponding origin and destination stops are identified/inferred as set forth above via 414-432.

When it is determined at 434 that no additional known users ($k_i$) 178-180 of the set of known users ({$k_1, \ldots, k_Q$}) remain for analysis, operations proceed to 436. Steps 436-446 of FIGS. 4A-4B provide for the mapping of origin and destination stops 160 to probable origin and destination locations in the city, which may or may not correspond to the physical locations of the respective stops. For example, an origin/destination stop 160 may be mapped to a sporting venue or school, based on the physical distance from the origin/destination stop to the building. Origin locations and destination locations may, of course, be selected from the same pre-defined set of locations. Thus, at 436, transportation routes 136 and schedules 138 are retrieved from the associated database 128. It will be appreciated that the transportation routes 136 and schedules 138 may include identification of vehicles, times, and stop locations of the transportation system 132. In one embodiment, a set of probable locations (Z={$z_1, \ldots, z_P$}) 144 for (P) partitions or zones of the city associated with the transportation system 132 is then retrieved from the associated database 128 at 438. Example location types may include, for example, school, business, point of interest, government, organizational, sporting event location, shopping, home, etc., with each one of its type given a unique identifier. Each zone may be associated with exactly one probable location, or in some cases may have more than one probable location.

At 440, a set of possible vehicles (B={$b_1, \ldots, b_W$} for (W) vehicles 142 on the transportation system 132) may then be defined for each segment ($d_j$) 140 in accordance with the retrieved routes 136 and schedules 138. A mapping component 114 then applies an assignment function (ao) 150 to map each origin stop (determined above) to a probable location (Z) 144 in accordance with the route 136 and schedule 138 so as to determine origin locations ($z_i$) 154 at 442. Similarly, at 444, the mapping component 114 applies an assignment function (ad) 152 to map each destination stop (inferred above) to a probable location (Z) 144 in accordance with the route 136 and schedule 138 so as to infer corresponding destination locations ($z_j$) 156. According to one embodiment, the assignment functions ao: A $\longmapsto$ Z 150 (where (A) is representative of an origin stop) and ad: B $\longmapsto$ Z 152 (where (B) is representative of an destination stop) can define a deterministic or probabilistic mapping to a possible location, depending on the manner in which the locations (Z) 144 were selected (e.g., the geographical partitioning of the city), the infrastructure of the routes 136 and corresponding schedules 138, the reliability of the data, user past history, and the like. For example, if the user's second recorded stop (an origin stop) of the day is at a bus stop on a bus route and the bus stop is within walking distance of a school, the school may be assigned as the user's destination location from the first stop of the day. Or, if the second stop is within walking distance of both a school and a sports stadium, the user's destination location from the first stop may still be assigned as the school, if for example, the time of day or day of the week does not correspond to the operating hours of the sports stadium, or if the user made this stop on previous or subsequent days with at least a threshold frequency, or other basis for the assignment of the school as the most probable location. In the case of some or all stops, the identity function may map the stop to exactly one respective location, for example, stop B is always mapped to location B. In some cases, the location may be a transportation hub on the network, such as a train or bus station.

Accordingly, with reference to FIG. 2, path A 200 in a given day may be reflected as: Stop A 166 to Stop C 168 to Stop B 170 to Stop C 168 to Stop A 166. Stops at Stop C may be identified as correspondence stops and thus ignored in the Algorithm. In such an example, the identity function may be used as the assignment functions to map Stops A and B to a respective probable location (Z) 144, such as "home" and "school B". The origin/destination locations 154-156 and corresponding number of known users (K) 178-180 are then stored in the associated database 128 at 446, after which operations proceed to FIGS. 4A-4B for a probability determination for each destination location ($z_j$) 156.

Turning now to FIG. 5, there is illustrated the determination of the probability (p) 148 of a destination location 156 being the destination of a selected origin location 154. At 502, a probable origin location ($z_i$) 154 is retrieved from the associated database 128. A probable destination location ($z_j$) 156 inferred as a destination of the origin location ($z_i$) 154 is then retrieved from the associated database 128 at 504. At 506, a first vehicle ($b_v$) 142 used to travel from origin location ($z_i$) 154 to the probable destination location ($z_j$) 156 is retrieved from the defined set of vehicles 142. That is, a vehicle ($b_v$) 142 that was first boarded by a known user (K) 178-180 at the origin location ($z_i$) 154 for travel to the probable destination location ($z_j$) 156, i.e., not just a vehicle having a route that corresponds to the origin location ($z_i$) 154.

The number of times that the vehicle ($b_v$) 142 was used to travel from the origin location ($z_i$) 154 to the probable destination location ($z_j$) 156 is then inferred, as represented by $$\left(z_i \xrightarrow{b_v} z_j\right).$$

The number of times that the origin location ($z_i$) 154 was an origin in the route associated with the vehicle ($b_v$) 142 is then determined at 510. The destination probability generator 116 then computes, at 512, the probability (p) 148 that the destination location ($z_j$) 156 is the destination of a user from the origin location ($z_i$) 154 using the vehicle ($b_v$) 142, as illustrated in Equation (1):

$$p\left(z_i \xrightarrow{b_v} z_j \mid K\right) = \frac{\text{number of } z_i \xrightarrow{b_v} z_j}{\text{number of times } z_i \text{ is origin in } b_v}. \quad \text{Eq. (1)}$$

Thus, a probability (p) 148 is computed that may be used to infer (as discussed in FIG. 6) whether a selected destination location 156 was the destination of an unknown user (L) 182-188 that boarded at the origin location ($z_i$) 154. The probability (p) 148 is then stored in the associated database at 514, and a determination is made at 516 whether another first vehicle ($b_{v+1}$) was used to travel from the origin location ($z_i$) 154 to the destination location ($z_j$) 156. Upon a positive determination, operations return to 508 and proceed as set forth above. When it is determined that no additional vehicles (b) 142 were first used at 516, a determination is made whether another probable destination location ($z_{j+1}$) 156 is associated with the origin location ($z_i$) 154. That is, whether another probable location was inferred to be a destination of the current origin location ($z_i$) 154.

Upon a positive determination at 518, operations return to 504, whereupon the additional probable destination location ($z_{j+1}$) is retrieved from the associated database and computation of the probability (p) 148 corresponding to that particular destination location ($z_{j+1}$) 156 is performed as set forth above. When it is determined at 518 that no additional destination locations ($z_j$) 156 remain associated with the current origin location ($z_i$) 154, operations proceed to 520. At 520, a determination is made whether any other origin locations ($z_i$) 154 remain on the database for analysis. Upon a positive determination at 520, operations return to 502, whereupon the origin location ($z_i$) 154 is retrieved from the database 128. Thereafter operations with respect to computing the probabilities (p) 148 associated with each probable destination location ($z_j$)

156 of the current origin location ($z_i$) 154 are performed. Upon a determination that no additional origin locations ($z_i$) 154 remain for analysis at 520, operations proceed to FIG. 6.

Figure 6:
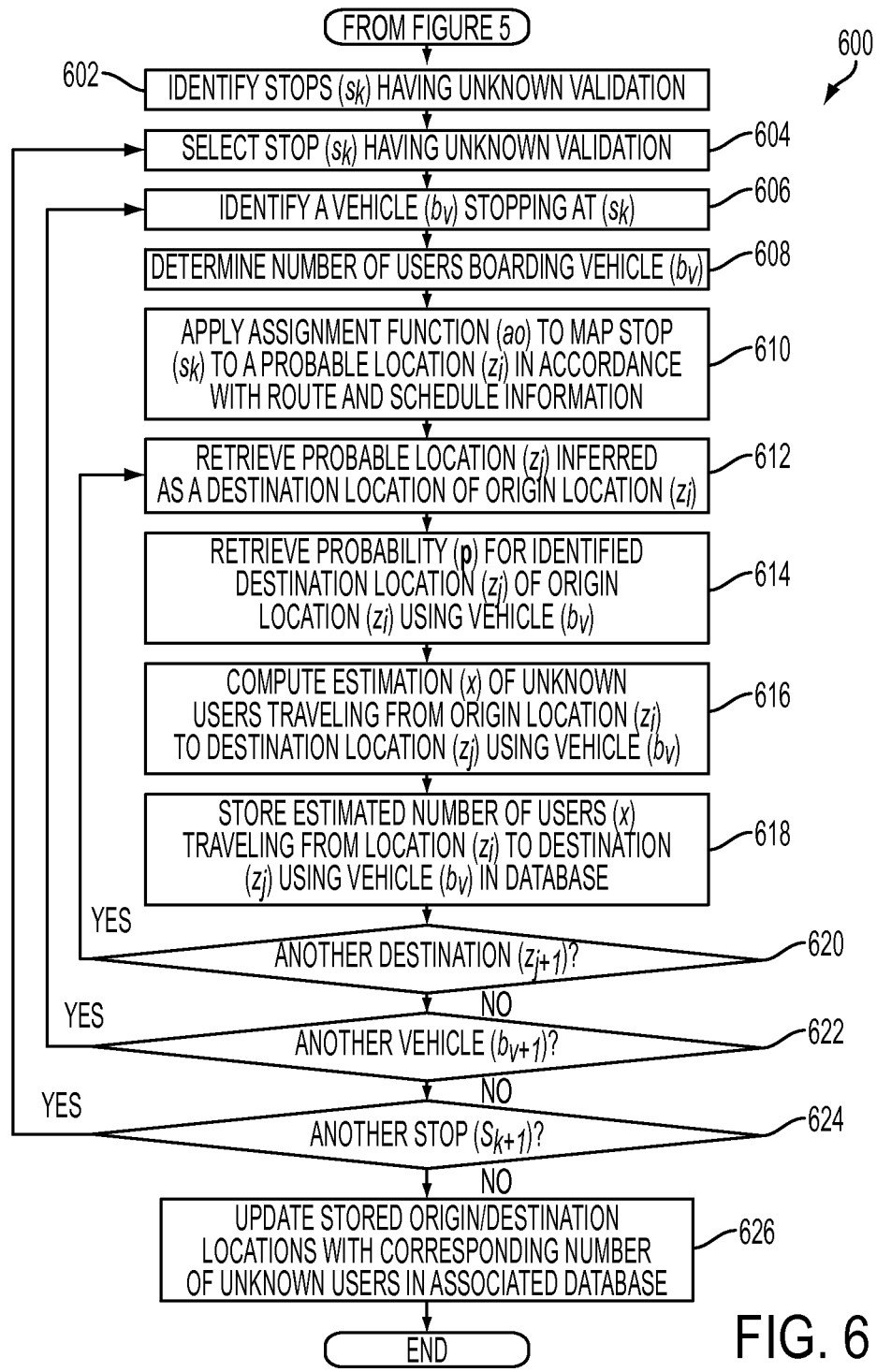
FIG. 6 is a flowchart which illustrates part of the method for estimating origins and destinations for users of a transportation network.

Turning now to FIG. 6 and ALGORITHM 2, there is shown a flowchart 600 that illustrates the determination of the probable destination locations ($z_j$) 156 of the set of unknown users (L) 182-188 of the transportation network 132. Operations of FIG. 6 may be better understood in conjunction with ALGORITHM 2, presented below, which illustrates the destination inferences for unknown users (L) 182-188 and the mapping of inferred destinations to probable locations (Z) 144:

---

For every zone $z_i$ being an origin:
  For every zone $z_j$ being a destination of $z_i$:
    For every first vehicle $b_v$ used to go from $z_i$ to $z_j$:
      Compute probability of current destination using $b_v$:

$$p\left(z_i \xrightarrow{b_v} z_j \mid K\right) = \frac{\text{NUMBER OF } z_i \xrightarrow{b_v} z_j}{\text{NUMBER OF TIMES } z_i \text{ IS ORIGIN IN } b_v}$$

For every stop $s_k$ with at least one unknown validation:
  For every bus $b_v$ in $s_k$:
    Use the assignment origin function ao to find corresponding origin zone: $z_i$
    For every zone $z_j$ being a destination of $z_i$:
      Compute estimation x of number of unknown users doing:

$$z_i \xrightarrow{b_v} z_j:$$

$$x = p\left(z_i \xrightarrow{b_v} z_j \mid K\right) \times (\text{number of unknown users entering vehicle})$$

---

FIG. 6 thus begins at 602, whereupon all stops (s) 160 having at least one unknown validation (i.e., validation information 134 corresponding to an unknown user (L) 182-188) are identified. A stop ($s_k$) 160 having at least one unknown validation is then retrieved at 604 from the identified stops. A vehicle ($b_v$) 142 at the retrieved stop ($s_k$) 160 is then identified at 606. That is, a vehicle ($b_v$) 142 that visited the stop ($s_k$) 160 during the course of its associated route 136 is identified, and the number of unknown users (L) 182-188 boarding the vehicle ($b_v$) 142 is determined at 608. The number of users may be determined based upon the validation information 134 associated with unknown users (L) 182-188). It will be appreciated that as the subject methods use pairs of origin-destination location 154-156, the actual path 146 of unknown users (L) 182-188 is irrelevant, and thus each validation of unknown users 182-188 is treated as a separate individual unknown user (L) 182-188. That is, regardless of whether the same person validated at these stops, for purposes of the subject methods, each validation is equated to a different unknown user (L) 182-188. At 610, the mapping component 116 applies the assignment function (ao) 150 to map the stop ($s_k$) 160 to a probable origin location ($z_i$) 144 in accordance with the route 136 and schedule information 138 associated with the vehicle ($b_v$) 142.

At 612, a probable destination location ($z_j$) 156 that has been inferred as a destination of the mapped origin location ($z_i$) 154 is retrieved. As set forth with respect to FIGS. 3-4, each origin location ($z_i$) 154 may have multiple destination locations ($z_j$) 156 identified as a destination of a known user (K) 178-180 boarding at the origin location ($z_i$) 154. At 614, the probability (p) 148 associated with the destination location ($z_j$) 156 and vehicle ($b_v$) 142 is retrieved from the associated database 128.

At 616, an estimation of unknown users (L) 182-188 traveling from the origin location ($z_i$) 154 to the destination location ($z_j$) 156 using the vehicle ($b_v$) 142 is computed. Computation of the number of unknown users (x) having the destination location ($z_j$) 156 may be made using Equation (2):

$$x = p\left(z_i \xrightarrow{b_v} z_j \mid K\right) \times (\text{number of users entering vehicle}) \qquad \text{Eq. (2)}$$

$$\text{where } p\left(z_i \xrightarrow{b_v} z_j \mid K\right),$$

is from Equation 1.

This portion of the users 178-188 of the transportation system 132, i.e., the estimated number of unknown users (L) 182-188, traveling from origin location ($z_i$) 154 to destination location ($z_j$) 156 using vehicle ($b_v$) 142 is then stored in the associated database 128 at 618. A determination is then made at 620 whether another destination location ($z_{j+1}$) 156 remains associated with the origin location ($z_i$) 154. Upon a positive determination at 620, operations return to 612, whereupon the additional destination location ($z_{j+1}$) may be identified. Upon a negative determination at 620, operations proceed to 622, whereupon a determination is made whether another vehicle ($b_{v+1}$) 142 corresponding to the origin location includes unknown validation information 134. Upon a positive determination at 622, operations return to 606, where the additional vehicle (b) 142 is identified as having at least one unknown user (L) 182-188 boarding at the stop ($s_k$) 160. When it is determined at 622 that no additional vehicles (b) 142 are associated with the stop ($s_k$) 160, operations proceed to 624. That is, upon a determination that no other vehicles ($b_v$) 142 of the transportation system 132 have a route 136 that indicates stopping at stop ($s_k$) 160, flow progresses to 624.

At 624, a determination is made whether any additional stops 160 (s) remain that have at least one unknown validation, i.e., validation information 134 corresponding to an unknown user (L) 182-188. When at least one additional stop ($s_{k+1}$) 160 remains having unknown validation information, operations return to 604, whereupon this next stop ($s_{k+1}$) 160 is selected and a vehicle ($b_v$) 142 having a scheduled stop (as indicated by the route 136 corresponding thereto) at the next stop ($s_{k+1}$) 160 and associated validation information 134 indicating an unknown user (L) 182-188 is identified at 606. The number of unknown users (L) 182-188 associated with the vehicle ($b_v$) 142 is then determined at 608 based upon the corresponding validation information 134, and operations continue as set forth above.

When it is determined at 624 that no additional stops (s) 160 remain, i.e., all stops ($\{s_1, \ldots, s_T\}$) having unknown users (L) 182-188 have been analyzed, operations proceed to 626. At 626, the stored probable origin/destination locations 154-156 are updated to reflect the determined number of unknown users (L) 182-188. Thus, the origin locations ($z_i$) 154 and the corresponding destination locations ($z_j$) 156 for each user 178-188 of the transportation system 132 may be estimated. It will be appreciated that such estimation allows for the determination of the number of travelers on the transportation system 132 boarding a particular vehicle 142 at a particular location (origin ($z_i$) 154) and alighting a particular location (destination ($z_j$) 156).

Figure 7:
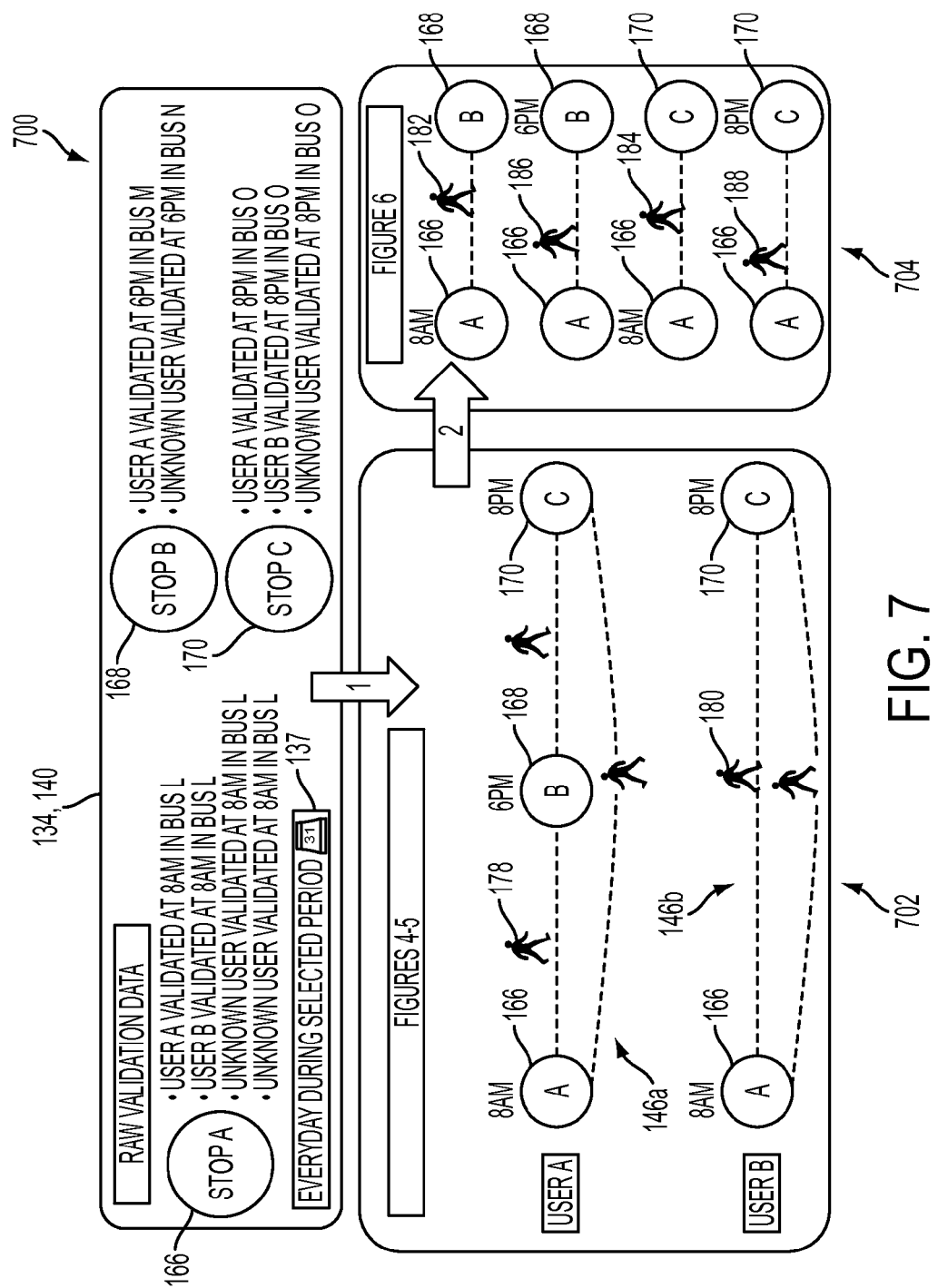
FIG. 7 is a functional diagram which depicts travel on a transportation network.

The methodology presented in FIG. 3 and further defined in FIGS. 4A-6 may be better understood in conjunction with the example illustration of FIG. 7. The example 700 of FIG. 7 diagrammatically depicts travel of known users (K) 178-180 and unknown users (L) 182-188 on a transportation system 132 during an analysis period segment 140. The information presented in FIG. 7 represents one day (segment 140) during a selected month (analysis period 137). According to the example, the validation information 134 presented in FIG. 7 is representative of a single analysis period segment 140 in the analysis period 137, and therefore illustrates the validation information 134 that has been collected for all users 178-188 at the three stops 166, 168, and 170.

Accordingly, the validation information 134 indicates that at stop A 166, known users A and B 178-180 boarded vehicle 142 (bus L) at 8:00 AM. Two unknown users 182 and 184 also boarded vehicle 142 (bus L) at 8:00 AM. The validation information 134 further indicates that at stop B 168, user A 178 validated, i.e., boarded a vehicle 142 (bus M) at 6:00 PM, and that an unknown user 186 boarded a vehicle 142 (bus N) at 6:00 PM. The validation information 134 for the analysis period segment 140 also indicates that user A 178, user B, and an unknown user 188 each validated at stop C 170 at 8:00 PM on the same vehicle 142 (bus O). It will be appreciated that the validation information 134 for each stop 166-170 may be retrieved from the associated database 128.

The probable paths 146a-146b of known users A and B 178-180 (shown at 702 of FIG. 7) are then resolved in accordance with the methodology 400 set forth in FIGS. 4A-4B. Thus, for user A 178, the validation information 134 is processed for the analysis period segment 140 to indicate the probable path 146a from stop A 166 to stop B 168 to stop C 170 to stop A 166. Similarly, the path 146b for user B 180 is indicated as stop A 166 to stop C 170 to stop A 166. Having resolved the probable paths 146a-146b, the probable origin locations ($z_i$) 154 and destination locations ($z_j$) 156 are ascertained as set forth in FIG. 7. For purposes of explaining FIG. 7, reference may be made herein to equating the stops A-C 166-170 as probable locations 154-156, however as set forth above, the probable locations 154-156 may correspond to locations near, but not coincident with the stops 166-170. Thus, for user A 178, stop A 166 has a destination at stop B 168, stop B 168 has a destination at stop C 170 and stop C 170 has a destination at stop A 166. This determination is also based upon the routes 136 associated with the vehicles 142 (bus L, bus M, and bus O) on which user A 178 traveled. For user B 180, stop A 166 has a destination at stop C 170 and stop C 170 has a destination at stop A 166. This determination is also based upon the routes 136 associated with the vehicles 142 (bus L and bus O) on which user B 180 traveled. The mapping performed in FIGS. 4A-4B may indicate that stops A-C 166-170 are origin locations ($z_i$) 154, and stops B-C 168-170 may be probable destination locations ($z_j$) 156 of stop A 166, stop C 170 may be a probable destination location 156 of stop B 168, and stop A 166 may be a probable destination location ($z_j$) 156 of stop C 170.

Thereafter, the probabilities (p) 148 for each destination location 156 are calculated, as set forth in FIG. 5 discussed above. The probabilities (p) 148 are then applied to each unknown validation 182-188 shown in FIG. 6. That is, the probability (p) 148 calculated that destination location 156 corresponding to stop B 168 is the destination from stop A 166 is applied to the two unknown validations for unknown users 182 and 184 (on bus L) to estimate the probable destination location ($z_j$) 156 for each unknown user 182-184. As shown at 704, application of the probabilities (p) 148 indicates that the probable-destination ($z_j$) 156 of unknown user 182 is stop B 168 and the probable-destination ($z_j$) 156 of unknown user 184 is stop C 170. Similar application of probabilities (p) 148 is made to the unknown users 186 and 188, respectively resulting in a probable destination location ($z_j$) 156 of stop A 166 for unknown user 186 (on bus N) and a probable destination location ($z_j$) 156 of stop A 166 for unknown user 188 (on bus O). Accordingly, the destination locations ($z_j$) 156 of each user 178-188 on the transportation system 132 during the analysis period segment 140 may be estimated using the systems and methods set forth above. The assignment of the destinations of the unknown users (L) 182-188 may be a hard assignment, i.e., exactly one most probable destination location ($z_j$) 156, or a soft assignment, i.e., where each of a set of destinations is assigned a probability as a destination location ($z_j$) 156.

The method illustrated in one or more of FIGS. 3-6 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-6, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for estimating origin and destination locations of users of a transportation system, comprising:
    acquiring validation information for a set of users of the transportation system, the set of users including a set of unknown users and a set of known users, the transportation system including a set of routes, each route including a set of stops which are selectable by users as origin stops and destination stops;
    for each of the set of known users, identifying origin stops from the validation information and predicting destination stops, based on the respective identified origin stops, during a segment of an analysis period;
    mapping at least some of the origin stops and predicted destination stops to respective origin and destination locations associated with the transportation system;
    based on the origin stops and respective predicted destination stops of the set of known users and the mappings, computing destination probabilities for the destination locations from respective origin locations;

apportioning unknown users of the set of users among the destination locations, based on the computed destination probabilities associated with each destination location and the validation information; and estimating destinations of the unknown users traveling from an origin location to a corresponding destination location on the transportation system in accordance with the apportionment, wherein at least one of the identifying, mapping, computing, apportioning or estimating is performed by a processor in communication with associated memory.

2. The method of claim 1, wherein the validation information includes, for each of a plurality of users, a unique ticket identification, at least one timestamp, at least one of a stop location and at least one vehicle identification.

3. The method of claim 2, wherein each segment of the analysis period is a day or part of a day, and wherein the analysis period includes a plurality of days.

4. The method of claim 2, wherein the unique ticket identification is at least one of a persistent identification corresponding to a known user and an anonymous identification corresponding to an unknown user.

5. The method of claim 2, wherein identifying origin stops and destination stops of known users further comprises:
defining a path for each known user of the plurality of users during a segment of the analysis period, the path including a set of ordered stops;
assigning each stop in the set of ordered stops as at least one of an origin stop and a destination stop in accordance with an order of the set of ordered stops.

6. The method of claim 5, further comprising:
identifying a stop in the set thereof as an origin stop when a subsequent stop in the set is present; and
assigning the subsequent stop as a destination stop associated with the identified origin stop.

7. The method of claim 6, further comprising identifying a last stop in the set thereof as an origin stop with a predicted destination stop corresponding to a first stop in the set.

8. The method of claim 2, wherein mapping of the stops to a corresponding probable origin location or a destination location further comprises:
applying an origin assignment function to each identified origin stop so as to map a corresponding origin location; and
applying a destination assignment function to each predicted destination stop so as to map a corresponding destination location.

9. The method of claim 8, wherein each of the origin locations and destination locations are mapped from a set of probable locations associated with the transportation system.

10. The method of claim 9, further comprising defining the set of probable locations in accordance with preselected geographical partitions of a city associated with the transportation network.

11. The method of claim 2, wherein calculating the destination probability further comprises identifying a vehicle associated with the vehicle identification from a set of vehicles, each of the vehicles in the set of vehicles having an associated route, the route including a scheduled origin stop and a scheduled destination stop corresponding to the identified origin stop and predicted destination stop, and
wherein predicting the destination stops further includes predicting the destination stops based on the respective identified origin stops and the identified vehicle.

12. The method of claim 11, wherein calculating the destination probability further comprises:
retrieving, from an associated database, route information and schedule information corresponding to the vehicle associated with the vehicle identification corresponding to the analysis period segment;
determining, from the validation information, a number of times a destination location is a destination from the origin location using the vehicle; and
determining, from the retrieved route and schedule information, a number of times the origin location is an origin stop of the vehicle during the analysis period segment,
wherein the destination probability is computed for each destination location in accordance with the determined number of times the destination location is the destination from the origin location using the vehicle and the determined number of times the origin location is an origin stop in the route of the vehicle.

13. The method of claim 12, wherein apportioning unknown users further comprises:
identifying each origin stop in the validation information including at least one unknown user;
for each identified origin stop, identifying at least one vehicle having a route associated therewith;
determining a number of unknown users of the at least one vehicle during the analysis period segment;
mapping each identified origin stop to a probable location of the transportation system in accordance with the assignment origin function;
identifying each destination location for each identified origin location; and
apportioning the determined number of unknown users to each identified destination location in accordance with the computed destination probability corresponding thereto.

14. The method of claim 1, further comprising;
outputting the estimated destinations of a set of users including known users and unknown users; and
refining at least one route of the transportation system based on the output estimated destinations.

15. The method of claim 5, wherein the path includes a single stop, further comprising:
identifying the single stop as an origin stop for the known user; and
designating a destination stop corresponding to the single stop as an unknown destination stop.

16. The method of claim 2, wherein the apportionment of the unknown users comprises identifying a number of the unknown users traveling on a vehicle with a route that extends from the origin location to the destination location.

17. A computer program product comprising a non-transitory recording medium storing instructions, which when executed on a computer causes the computer to perform the method of claim 1.

18. A system comprising memory storing instructions for performing the method of claim 1, and a processor in communication with the memory which implements the instructions.

19. An origin and destination estimation system, comprising:
a path generator component configured for defining a set of ordered stops from validation information for each known user of a transportation system during a segment of an analysis period, the validation information comprising a unique ticket identification, at least one vehicle identification, at least one stop location, and at least one timestamp;

memory which stores:
instructions for identifying origin stops and predicting destination stops of each known user during the analysis period segment from validation information for a plurality of users of the transportation system;
a mapping component configured for mapping each identified origin stop to a corresponding probable origin location associated with the transportation network with an origin assignment function and mapping each predicted destination stop to a corresponding probable destination location associated with the transportation system with a destination assignment function; and
a destination probability generator configured for computing a destination probability for each destination location of an individual origin location,
instructions for:
apportioning unknown users to each destination location in accordance with a number of unknown users on a vehicle associated with the vehicle identification and traveling from the origin location to the destination location, the computed destination probability associated with each destination location, and the validation information, and
estimating a destination of each unknown user traveling from an origin location to a corresponding destination location on the transportation system in accordance with the apportionment; and
a processor in communication with the memory which implements at least one of the path generator, the mapping component, and the destination probability generator.

20. The system of claim 19, wherein the destination probability generator is further configured for:
retrieving, from an associated database, route information and schedule information corresponding to the vehicle associated with the vehicle identification corresponding to the analysis period segment;
determining, from the validation information, a number of times a destination location is predicted to be a destination from the origin location using the vehicle;
determining, from the retrieved route and schedule information, a number of times the origin location is an origin stop of the vehicle during the analysis period segment; and
computing the destination probability for each destination location in accordance with the determined number of times the destination location is the predicted destination from the origin location using the vehicle and the determined number of times the origin location is an origin stop in the route of the vehicle.

21. The system of claim 20, wherein the memory further stores instructions which are executed by the processor for:
identifying each origin stop in the validation information including at least one unknown user and at least one vehicle having a route associated with the identified origin stop;
determining a number of unknown users of the at least one vehicle during the analysis period segment;
mapping each identified origin stop to a probable location of the transportation system in accordance with the assignment origin function;
retrieving each destination location corresponding to each identified origin location; and
apportioning the determined number of unknown users to each retrieved destination location in accordance with the computed destination probability corresponding thereto.

22. A computer-implemented method for estimating origin and destination locations of users of a transportation system, comprising:
acquiring validation information for each of a plurality of users of a transportation system for a selected analysis period, the validation information including a unique ticket identification, at least one vehicle identification, at least one stop location, and at least one timestamp;
defining a path for each known user of the plurality of users during a segment of the analysis period, the path including a set of ordered stops;
assigning each stop in the set of ordered stops as at least one of an origin stop and a destination stop in accordance with the order of the stops;
mapping each assigned stop to a corresponding origin location or a destination location;
computing a destination probability of known users for each of a set of destination locations associated with each origin location;
apportioning unknown users of the plurality of users to each destination location in accordance with the computed destination probability; and
estimating destination locations for each of the plurality of users during the analysis period segment;
wherein at least one of the defining, assigning, mapping, computing, apportioning, and estimating is performed with a computer processor.

23. The computer-implemented method of claim 22, wherein mapping each stop to a corresponding origin location or a destination location further comprises:
applying an origin assignment function to each origin stop so as to map the corresponding origin location; and
applying a destination assignment function to each destination stop so as to map the corresponding destination location.

24. The computer-implemented method of claim 23, wherein computing the destination probability further comprises:
retrieving, from an associated database, route information and schedule information corresponding to a vehicle associated with the vehicle identification corresponding to the analysis period segment;
determining, from the validation information, a number of times a destination location is predicted as a destination from the origin location using the vehicle; and
determining, from the retrieved route and schedule information, a number of times the origin location is an origin stop of the vehicle during the analysis period segment,
wherein the destination probability is computed for each destination location in accordance with the determined number of times the destination location is predicted to be the destination from the origin location using the vehicle and the determined number of times the origin location is an origin stop in the route of the vehicle.

25. The computer-implemented method of claim 24, wherein apportioning unknown users further comprises:
identifying each origin stop in the validation information including at least one unknown user;
for each identified origin stop, identifying at least one vehicle having a route associated therewith;
determining a number of unknown users of the at least one vehicle during the analysis period segment;
mapping each identified origin stop to a probable location of the transportation system in accordance with the assignment origin function;
predicting each destination location corresponding to each identified origin location; and apportioning the determined number of unknown users to each predicted destination location in accordance with the computed destination probability corresponding thereto.

* * * * *